United States Patent
Barber et al.

(10) Patent No.: US 6,298,530 B1
(45) Date of Patent: *Oct. 9, 2001

(54) REINFORCED COILED ELECTRODE ASSEMBLIES AND METHODS OF PRODUCING SAME

(75) Inventors: Donald Barber, Cheshire; Robert Smith, Southbury; Robert Pavlinsky, Stratford; Bruce Ingram, Terryville, all of CT (US)

(73) Assignee: Duracell Inc., Bethel, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/589,852

(22) Filed: Jun. 8, 2000

Related U.S. Application Data

(63) Continuation of application No. 08/908,881, filed on Aug. 8, 1997, now abandoned.

(51) Int. Cl.[7] .................................................. H01M 10/04
(52) U.S. Cl. .................................................. 29/2; 429/211
(58) Field of Search .................................... 429/211, 235, 429/236, 237, 241, 161; 29/2, 623.1, 623.4

(56) References Cited

U.S. PATENT DOCUMENTS

| | | |
|---|---|---|
| 4,049,882 | 9/1977 | Beatty . |
| 4,329,281 | 5/1982 | Schneider et al. . |
| 4,963,445 | 10/1990 | Marple et al. . |
| 5,154,993 | 10/1992 | Beatty . |
| 5,314,544 | 5/1994 | Oweis . |
| 5,329,681 | 7/1994 | Sauer . |
| 5,657,522 | 8/1997 | Figueira et al. . |
| 5,667,915 | 9/1997 | Loustau et al. . |
| 5,773,164 | 6/1998 | Venkatesan et al. . |

FOREIGN PATENT DOCUMENTS

| | | |
|---|---|---|
| 2200068A | 7/1988 | (GB) . |
| 53-25839 | 3/1978 | (JP) . |
| 62-202457 | * 9/1987 | (JP) . |
| 63-40252 | 2/1988 | (JP) . |
| 5-13064 | 1/1993 | (JP) . |
| 5-205735 | 8/1993 | (JP) . |
| 09-017425 | * 1/1997 | (JP) . |

OTHER PUBLICATIONS

Crompton, TR, Battery Reference Book, 2nd Edition;(Reed Educational and Professional Publishing, Ltd., Boston 1996), Chapter 19, p. 10 (No Month available).

Linden, "Handbook of Batteries", p. 28.6/Fig. 28.5, 1995 (McGraw–Hill, Inc., NY) (No Month Available).

* cited by examiner

Primary Examiner—Stephen Kalafut
Assistant Examiner—Susy Tsang
(74) Attorney, Agent, or Firm—Fish & Richardson P.C.

(57) ABSTRACT

The present invention relates to coiled electrode assemblies having conductive tabs, methods of attaching the conductive tabs to the coiled electrode, and electrochemical cells employing such assemblies. An electrode plate which is coated with active material has a designated area for tab attachment. The conductive tab area's active material is pierced with opposing, offset piercing plates which have raised surface probes which penetrate the conductive tab area's coating and substrate. This tab area is cleared of active material and reinforced with a reinforcing material and a conductive tab is welded to the thus treated area resulting in an electrode plate having a strong integrated tab assembly.

16 Claims, 4 Drawing Sheets

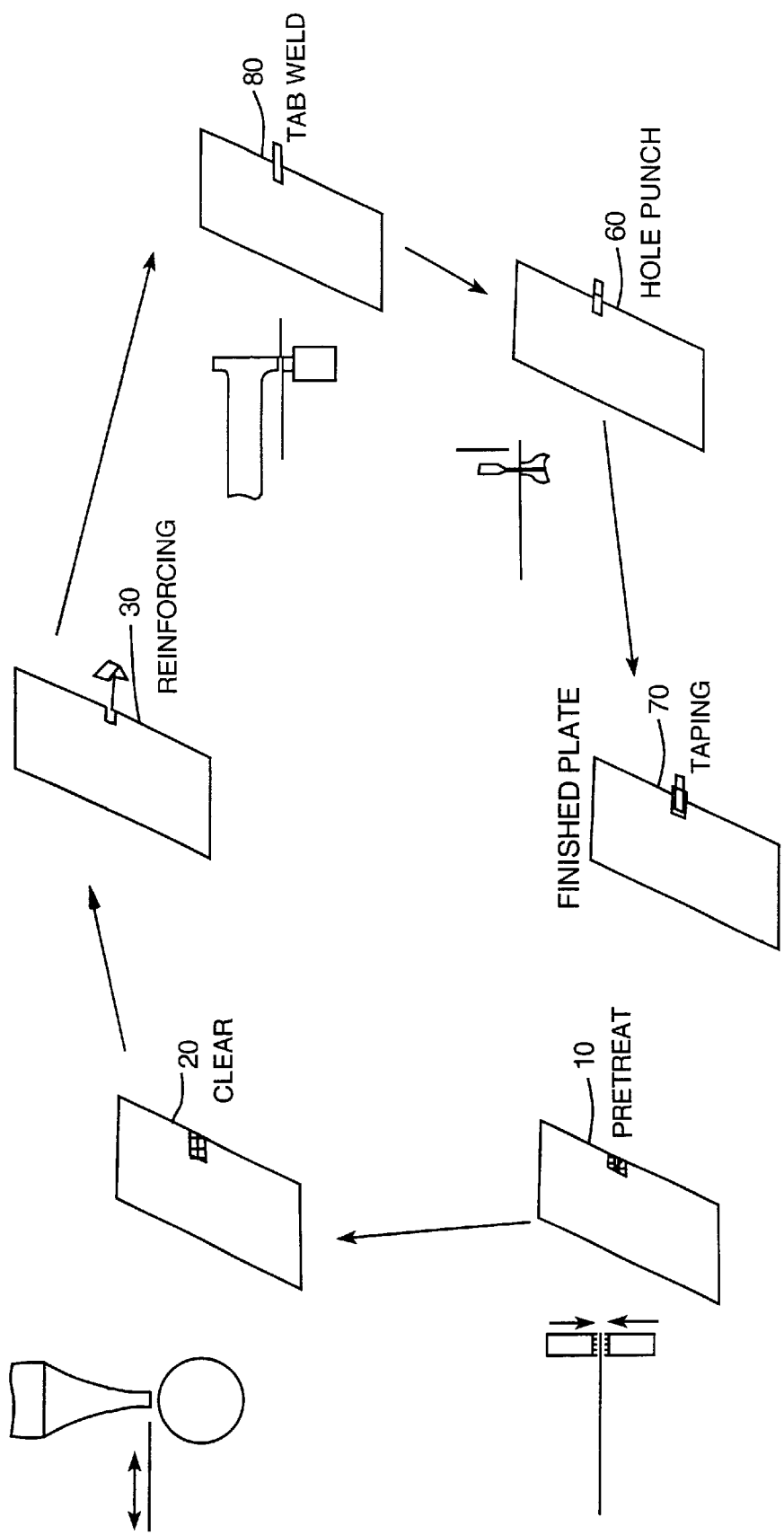

REINFORCED COILED ELECTRODE ASSEMBLIES AND METHODS OF PRODUCING SAME

This application is a continuation of U.S. patent application Ser. No. 08/908,881, filed Aug. 8, 1997, now abandoned, the entire contents of which are hereby incorporated by reference.

BACKGROUND OF THE INVENTION

This invention relates to coiled electrode assemblies having conductive tabs, methods of attaching the conductive tabs to the coiled electrode, and electrochemical cells employing such assemblies.

Electrochemical cells employing coiled electrode assemblies are widely known in the art. In many of these cell structures the coiled electrode assembly is inserted into a composite housing which serves as the current conductive terminals for the cell. When this type of cell is assembled, a conductive tab must first be secured to the electrodes by an appropriate means such as welding.

Cells employing coiled electrode assemblies can be produced using various electrochemical systems such as nickel metal hydride, nickel cadmium, nickel zinc and the like. When using nickel metal hydride cells, the negative electrode of nickel metal hydride cells is typically a hydrogen storage electrode in the form of a metal hydride. The positive electrode is typically nickel hydroxide. These cells also contain a separator and electrolyte, as is known in the art.

The positive electrode strip is generally the outermost wound electrode for nickel metal hydride cells and has a conductive tab secured to a selected area of the carrier at one end and to the cell housing at the opposite end. Prior to securing the conductive tab to the electrode, a selected area of the conductive carrier must be cleared of any active electrode material. Conventionally, this removal is by processes such as air blasting, scraping, suction, ultrasonic clearing and the like. However, use of these methods is carrier (substrate) dependent both for efficiency of removal of active material from the substrate and strength of the resulting weld connection of the conductive tab to the substrate.

With the development of conductive carriers made of felt, foam and other fragile substrates, the task of removing active material from the substrate and attaching a conductive tab has become more difficult. Various methods have been used to break or loosen the active material from the substrate, such as ultrasonic removal of active material from the desired area, removal of active material from the substrate along an entire edge of the electrode, attaching conductive tabs in the shape of a "t" or "v" or "h" in order to strengthen the tab area, and others.

Although removal of active material from the entire length of the electrode contributes to manufacturing efficiency of these type cells, the trend today is to maximize capacity by reacting as much of the active material present in the electrochemical cell as possible. The need still exists for methods of manufacturing coiled electrode assemblies which substantially remove only a small section of active material from fragile substrates without weakening or damaging the substrates, and which allow for attachment of a conductive tab to the thus cleared substrates.

SUMMARY OF THE INVENTION

The invention relates to electrode plates used in coiled electrode assemblies having a conductive tab attached thereon. By treating the conductive tab area of an electrode plate coated with active material in the manner described herein, subsequent steps of ultrasonic clearing removes substantially all of the active material present in that area. Significantly, the cleared area is reinforced with a reinforcing material. Ultrasonic welding of a conductive tab to the thus treated area results in an electrode plate having a strong integrated tab assembly.

The first step of the invention is a piercing step, where opposing, offset piercing plates are pressed against the electrode plate in the conductive tab area. The piercing plates have raised surface probes which penetrate the active material and form a pattern of pinholes in the treated area. The next step of clearing the treated area results in a conductive tab area substantially free of active material. After the clearing step, the area is reinforced with a reinforcing material by folding and compressing the material on the cleared area. Various types of conductive tabs may then be attached to the cleared area, resulting in a strong integrated tab assembly.

It has also been found that electrodes prepared by the process of the present invention are easier to assemble as coiled assemblies for use in electrochemical cells, due to a relatively flat tab area. In addition, the process allows for incorporation of more active material in the finished electrochemical cell, resulting in higher capacity. The reinforcement can strengthen the weld and can lead to longer product lifetimes.

BRIEF DESCRIPTION OF THE DRAWING

FIG. 4 is a schematic diagram depicting an ultrasonic welding process.

DESCRIPTION OF THE PREFERRED EMBODIMENTS

In the first step of the process of the present invention, the conductive tab area of an electrode plate is pierced with opposing, offset piercing plates having raised surface probes. In the next step, the resulting area is cleared of active material to expose an underlying, porous substrate substantially free of active material. The cleared area is reinforced with a reinforcing material. A conductive tab is then attached to the exposed, underlying, porous substrate.

Substrates useful in the preparation of positive electrodes in electrochemical cells made in accordance with this invention include any high porosity substrate having low mechanical strength such as foam, felt and the like. The substrates are coated with active material for the desired electrochemical system.

In the case of nickel metal hydride cells, the active material of the positive electrode comprises one or a mixture of nickel compounds such as nickel hydroxide. The active material may also include other compounds, as known in the art, including a conductivity enhancer such as cobalt oxide, a conductive material such as carbon black, a thickening agent, a binder, and the like. The metal powders and other components are mixed with water to form a wet slurry, which may be coated onto the porous substrate by any known methods such as doctor blades, roller coating, spray coating and the like. The coated substrate may then be dried and subjected to a calendaring process to form a smooth, hardened electrode plate using means known in the art. The final thickness of the electrode plates normally ranges from about 0.6 to 0.7 mm, preferably 0.63 to 0.67 mm. The electrode plates are then cut to the desired size for use in an electrochemical cell.

It has been found that by piercing the conductive tab area with opposing, offset piercing plates, the conductive tab area may be substantially cleared of active material without damaging the underlying porous fragile substrate. The conductive tab area to be cleared of active material may be slightly larger than the width of the conductive tab to be attached to the cleared area. The piercing step is described in more detail in U.S. Ser. No. 08/649,890, filed May 4, 1996, which is assigned to the same assignee as the present application and is hereby incorporated by reference.

Figure 1:
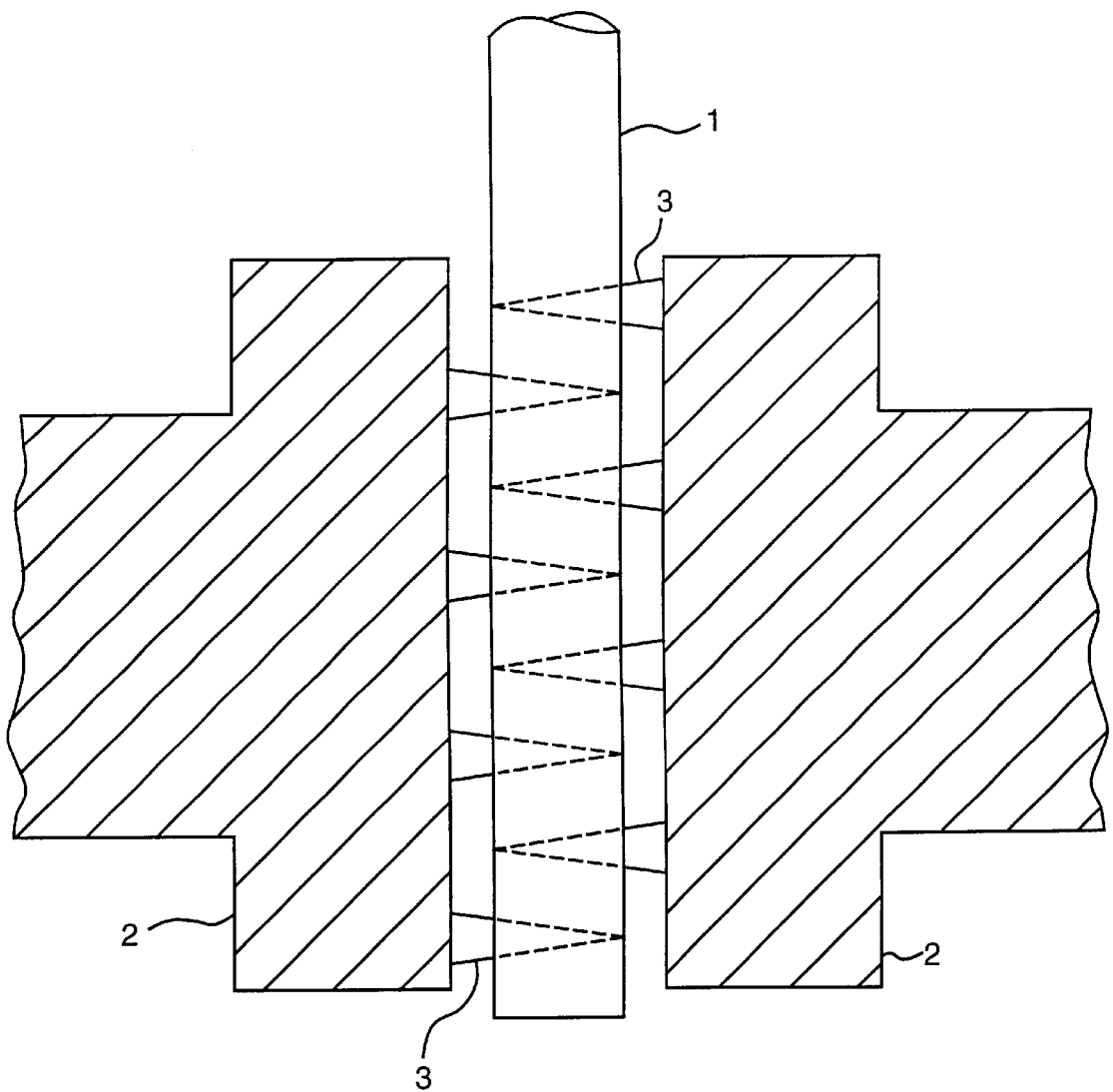
FIG. 1 is a side view of an electrode plate in contact with piercing plates having raised surface probes.

FIG. 1 shows a front view of electrode plate 1 in contact with opposing piercing plates 2 in the piercing step. Electrode plate 1 is subjected to a pressure of about 20 to 110 psi from opposing piercing plates 2 having offset raised surface probes 3 ending in a point. The raised surface probes are offset such that when the opposing piercing plates contact the electrode plate, the points of raised surface probes 3 penetrate the surface of the underlying porous substrate without contacting each other. In a most preferred embodiment, the raised surface probes penetrate the electrode plate through the underlying substrate but do not exit the opposite surface of the electrode plate.

Figure 2:
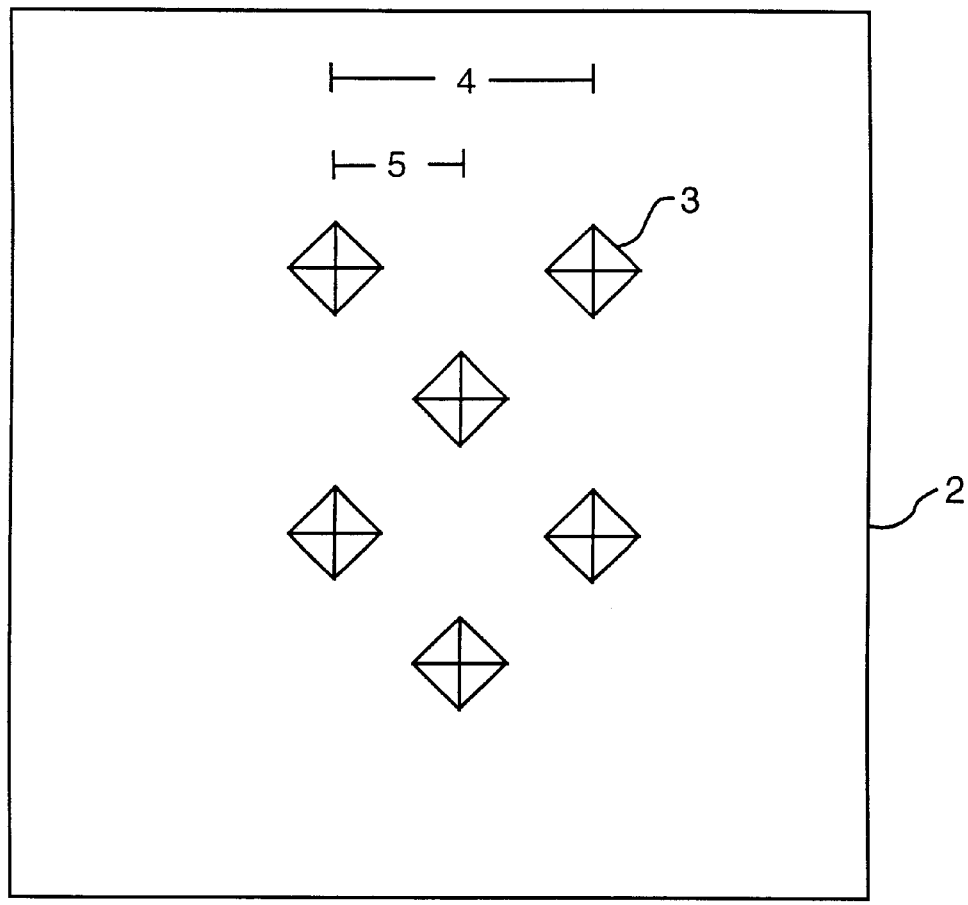
FIG. 2 is a front view of a piercing plate having raised surface probes.
Figure 2A:
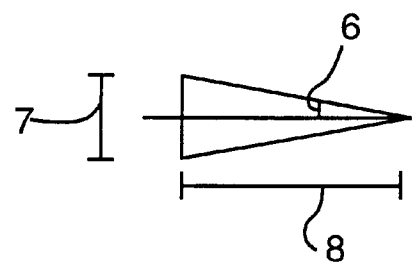
FIG. 2a is an exploded side view of a raised surface probe of a piercing plate.

FIG. 2 shows a front view of piercing plate 2 having offset raised surface probes 3. The surface probes are offset from adjacent probes by distance 4, and from the next row of surface probes by distance 5, such that opposing surface probes avoid contacting each other when pressed against the electrode plate. As shown in FIG. 2a, an exploded side view of one surface probe, the surface probes are preferably sharply angled 6, being less than 20 degrees, preferably 18 to 22 degrees from a line drawn perpendicular from the base of the surface probe to the point of the surface probe. The surface probes have base 7 of about 0.4 mm and are approximately 0.6 mm in height 8, depending on the thickness of the electrode plate. The base and height of the surface probes may vary from these dimensions to prevent damage to the underlying, porous substrate. For example, if more narrow surface probes are used, the probes may exit the opposite side of the electrode plate without damaging the underlying, porous substrate. If wider surface probes are used, the depth of penetration of the surface probes into the electrode plate should be such that the underlying, porous substrate is not damaged.

The electrode plate conductive tab area that has been treated with the above described piercing step has pinhole, diamond shaped patterns on the surface of the electrode plate. Depending on the type of substrate and thickness of active material applied, one or more than one piercing steps may be used to facilitate substantial removal of active material from this area during the next clearing step.

In the next step of the process, the conductive tab area is cleared of active material using conventional means. In a preferred embodiment, ultrasonic treatment is used to remove the active material. It is believed that the piercing step of the present invention also lowers the amount of ultrasonics needed to substantially remove active material from the treated area, resulting in less damage to the underlying fragile substrate. The type of equipment used for applying ultrasonics to the treated area varies and typically includes an ultrasonic horn having either smooth or raised surfaces and an anvil having either smooth or raised surfaces. In a most preferred embodiment of the present invention, the ultrasonic horn has a smooth surface and the anvil consists of a movable wheel with raised surfaces having diamond shaped blunt points to prevent damage to the substrate. The amount of ultrasonics applied is typically in the range of at least about 20 kHz at 100 percent amplitude (approximately 20 kilojoules energy) for a duration of about 0.5 to 1.0 second.

A conductive tab area treated with the piercing step and followed by an ultrasonic clearing step has an underlying, porous substrate substantially free of active material in the conductive tab area. The integrity of the fragile substrate remains intact.

As a comparison, when the conductive tab area is cleared using only ultrasonic clearing without the piercing step, damage to the fibers of the underlying fragile, porous substrate can be observed. Ultrasonic clearing of the conductive tab area without the use of at least one piercing step destroys the ability to weld a conductive tab to the cleared conductive tab area of the substrate.

The cleared electrode plate is reinforced with a reinforcement material, such as a filler material like a conductive foam or felt. For example, the conductive foam can be a nickel foam (e.g., 340, 400, or 500 basis weight material.) available from Katayama, Japan, or Retec Porous Metals, Tuscumbia, Ala. Generally, the reinforcement material is delivered to a cutting operation where the material is positioned over a folding gripper and chopped to a specified length. A small section of the reinforcement material is generally cut that has an area that is approximately equal to the cleared area. The reinforcement material can then be formed into a "V" shape by forcing a plunger against the material and into a set of grippers. The reinforcement material is then positioned over the cleared area of the electrode plate and compressed to be flush with the surface of the electrode plate. Single ply or double ply reinforcement materials can be used.

After the reinforcement material has been compressed into the cleared area of the electrode plate, the reinforcement material can be staked in place with a weld, such as a resistance weld or an ultrasonic weld. The welded can make the tab attachment stronger and can improved the continuity between the filler material and the electrode plate.

After removal of the active material from the treated area and reinforcement of the area, a conductive tab may be attached to the substrate using ultrasonic or resistance welding. The conductive tab may be nickel or nickel plated steel, and may be of any desired shape such as a double layer tab (v-shaped or h-shaped) or a rectangular, flat, single layer tab. In a preferred embodiment of the present invention, a rectangular shaped, single layer tab is attached to the substrate using ultrasonic welding. Ultrasonic welding is accomplished using means known in the art. In a preferred embodiment, the ultrasonic horn has raised surfaces and the anvil has a flat surface. In order to form a friction weld between the substrate and the conductive tab, ultrasonic vibrations are applied at 20 kHz and 100 percent amplitude in a direction parallel (180 degrees) to the surfaces to be welded, with a weld pressure of about 30 psi. Depending on the type of conductive tab to be used, the weld energy may range from about 18 joules for a single layer tab up to about 30 to 45 joules for a double layer tab, with a weld time of about 0.5 to 1 second.

In a most preferred embodiment of the present invention, a single layer conductive tab is attached to the cleared fragile substrate using an ultrasonic horn having a raised surface and an anvil having a flat surface. It is unexpected that a single layer conductive tab and a fragile substrate would form a sufficient friction weld using a flat anvil. Typically, ultrasonic welding of a conductive tab to a fragile substrate involves the use of a double layer conductive tab, such as an h tab or v tab. These type double layer tabs facilitate use of both an anvil having raised surfaces and an ultrasonic horn having raised surfaces since the substrate is sandwiched between two metal layers and is not in contact with either the ultrasonic horn or the anvil. The use of an anvil having raised surfaces would destroy the exposed fragile fibers of the substrate when welding a single layer conductive tab. It has been found that by using methods of the present invention, all forms of tabs may be successfully welded to the conductive tab area of a fragile, porous substrate using a flat anvil.

The positive electrode having a conductive tab attached as described above, may then be processed using conventional steps. These steps may include providing a punch hole in the tab above the electrode edge to improve flexibility and facilitate attachment of the tab to the cell cap; and/or taping of the conductive tab and conductive tab area to insure additional strength of the weld and to prevent internal shorts.

The ability to use a single layer conductive tab as opposed to a double layer conductive tab provides improvements in commercial manufacturing processes by eliminating a raised area which is normally associated with coiled electrode assemblies having a double layer tab (i.e. double thickness). The elimination of this raised area also reduces the possibility of internal shorts, and allows for the use of additional layers of electrodes to be incorporated into coiled electrode assemblies.

The following examples compare the results of ultrasonic welding and conventional resistance welding using methods of the present invention. Positive electrodes are prepared by wet slurry of the desired ingredients (nickel hydroxide, cobalt oxide, gelling agent, binder and carbon black) onto nickel plated foam substrates weighing between about 320 $m^2/g$ to about 500 $m^2/g$, such as Eltec 400 foam from Eltec, Inc. The coated substrate is then dried at approximately 110 to 120 degrees Centigrade and calendared using pressures between about 30 to 40 tons to form the positive electrode plates. The positive electrode plates are then cut to the desired size. A series of electrode plates are prepared using one or more piercing steps of the present invention, to form a treated conductive tab area. The conductive tab area is then cleared using ultrasonic clearing with an ultrasonic horn having a smooth surface and a movable wheel anvil having raised surfaces.

A single layer conductive tab is then attached to the cleared area using ultrasonic welding. Ultrasonic welding is carried out using an ultrasonic horn having raised surfaces and an anvil having a smooth surface. Using conventional resistance welding, a double layer conductive tab is attached to a second series of electrode plates prepared as described above.

The strength of the tab welds are measured using a standard pull test on Lloyd Instruments, Model LRX, Pull-tester. The test is run by clamping one end of the tester assembly to the conductive tab, and the other end to the bottom of the electrode plate. The clamps are then pulled in opposite directions at a speed of 5 mm per minute until the connection between the tab and the electrode plate reaches the maximum force just prior to weakening of the conductive tab/substrate weld. The results are reported in Table 1.

A comparative example was run using an electrode plate which has been cleared ultrasonically without using a piercing step of the present invention. A single layer conductive tab could not be welded to this electrode plate using ultrasonic welding due to damage to the underlying substrate and incomplete clearing of active material from the conductive tab area. The results are shown below in Table 1. Each sample identification represents an average result for five samples from five different lots, using identical processing steps.

TABLE 1

| | Pull Test | |
| --- | --- | --- |
| Sample | Ultrasonic Weld w/tape (kg) | Resistance Weld w/tape (kg) |
| A | 0.7 | 0.71 |
| B | 0.71 | 0.66 |
| C | 0.77 | 0.62 |
| D | 0.7 | 0.84 |
| Comparative | No Weld Possible | — |

The results show consistent weld strength when attaching a single layer conductive tab using the process of the present invention. In addition, the process of the present invention provides single layer tab/substrate weld strengths comparable to those using double layer tab/substrate resistance welds.

The conductive tab can be attached by resistance welding. In the first step in this process, the electrode is pretreated to loosen the coating prior to clearing. Partly because of the relatively high density of the calendared electrode material, subsequent processing steps are more effective when the surface of the electrode plate has been fractured.

Figure 3:
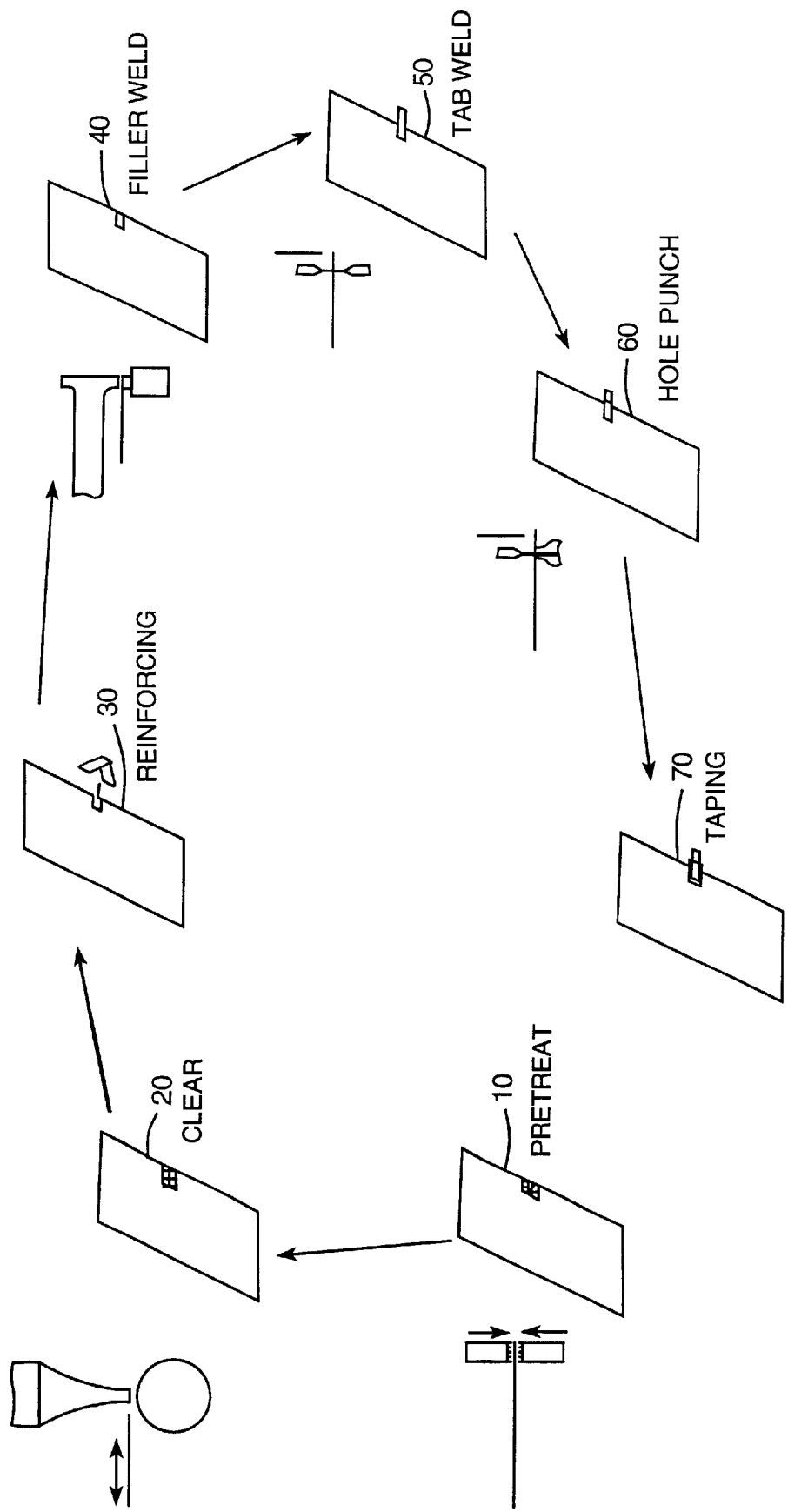
FIG. 3 is a schematic diagram depicting a resistance welding process.

Referring to FIG. 3, the electrode plate is presented to pretreatment station 10, perpendicular to the fracturing tips for the piercing step. One fracturing tip is located on top of the electrode surface, the other is below. The fracturing tips are a set of opposing "jaws" that pierce the surface of the electrode to a particular depth and fracture the material without causing excessive damage to the substrate.

The pretreated electrode plate is presented to ultrasonic clearing station 20. The pretreated plate is positioned perpendicular to an ultrasonic horn and anvil combination. The gap between the horn and anvil is predetermined to fit the dimensions of the electrode plate. The pretreated plate is introduced to the clearing station. A small area is cleared (e.g., 6 mm by 7 mm), by moving the horn/anvil combination across the area of the electrode plate to be cleared, parallel to the electrode and to a specified depth. Clearing is accomplished by ultrasonic vibration for a set time.

The cleared electrode plate is reinforced at reinforcement station 30. A reinforcement material is applied in a three-step process First, the reinforcement material positioned over a folding gripper and chopped to a specified length. The reinforcement material is then formed into a "V" shape by forcing a plunger against the material and into a set of grippers. The reinforcement material is then positioned over the cleared area of the electrode plate and compressed to be flush with the surface of the electrode plate.

After the reinforcement material has been compressed into the cleared area of the electrode plate, the reinforcement material is staked in place with a weld at staking station 40.

The weld can make the tab attachment stronger and can improved the continuity between the filler material and the electrode plate. The staking weld can be a resistance weld or an ultrasonic weld.

After reinforcement, a conductive tab is welded to the electrode plate at resistance welding station 50. The electrode plate is presented to the welding station perpendicular to the welding tips. A short piece of conductive tab stock (e.g., 4 mm by 18 mm) is fed into position over the cleared, reinforced area of the electrode plate. The tab material is positioned over the reinforced area and welded with resistance welding equipment using between 1 and 4 welding nuggets. The resistance weld can be carried out using either direct welding equipment (opposing electrodes) or indirect welding equipment (parallel gap). Prior to welding, the tab can be cut to a desired length.

After welding, the tab can have holes punched in two specified locations to facilitate bending during assembly operations. The punching can take place at punching station 60. In addition, two pieces of tape can be placed over the tab (e.g., on either face of the electrode plate) in order to insulate and prevent shorting after closing the cell. The tape can also add strength to the tab/plate connection. The tape can be applied at taping station 70.

Alternatively, the conductive tab can be attached by ultrasonic welding. Referring to FIG. 4, the electrode plate is presented to pretreatment station 10 to pierce the surface of the electrode plate. The pretreated electrode plate is presented to ultrasonic clearing station 20, and a small area is cleared (e.g., 6 mm by 7 mm). The cleared electrode plate is reinforced at reinforcement station 30 in, for example, a three-step process.

After reinforcement, a conductive tab is welded to the electrode plate at ultrasonic welding station 80. The ultrasonic welder consists of a horn and anvil combination set at an optimized gap and performs welding by vibration. The electrode plate is presented to the welding station perpendicular to the horn and anvil. A short piece of conductive tab stock (e.g., 4 mm by 18 mm) is fed into position over the cleared, reinforced area of the electrode plate. The horn is activated to compress the material and weld it in place using ultrasonics.

After welding, the tab can have holes punched at punching station 60 and tape can be applied at taping station 70.

The following examples are intended to be illustrative and not limiting of the invention.

EXAMPLE 1

Three groups of electrodes were constructed. Group 1 electrodes were prepared from a Retec foam (Bridgestone precursor) and did not include a reinforcing foam. Group 2 electrodes were prepared from a Katayama foam and did not include a reinforcing foam. Group 3 electrodes were prepared from a Katayama foam. The Group 3 electrodes were cleared, reinforced with 5.5 mm by 16 mm piece of 420 Retec foam, resistance staked, and resistance tab welded.

Twelve electrodes from each of Groups 1, 2, and 3 were tested for impedance and tab pull (tensile) strength. The tensile strength was determined using a Chatillion force gauge. The separating speed was set at 5 mm/min and the force was recorded in kilograms. Impedance testing was performed using a HP4338A impedance meter and an impedance fixture. The impedance was recorded in milliohms. The results of the tests are summarized in Table 2. Unreinforced electrodes (Groups 1 and 2) had higher impedance and lower tensile strengths than the reinforced electrodes (Group 3).

TABLE 2

| Group | Impedance (Average, mΩ) | Impedance Range (low/high, mΩ) | Tensile strength (Average, kg) | Tensile Strength Range (low/high, kg) |
|---|---|---|---|---|
| 1 | 7.03 | 6.26/7.90 | 0.53 | 0.32/0.78 |
| 2 | 8.6 | 8.31/8.90 | 0.38 | 0.32/0.56 |
| 3 | 5.78 | 5.58/6.02 | 2.34 | 2.72/2.90 |

EXAMPLE 2

Eight groups of twenty electrodes (Groups A–H) were constructed and tested. The electrodes were pretreated and cleared by ultrasonic clearing. Groups A, C, E, and G were not reinforced. Groups After clearing in Groups B, D, F, and H, the foam filler material (16 mm×5.5 mm) was folded in half and pressed into the cleared area using a needle nose pliers. The tab was welded to the electrode using the ultrasonic welding conditions listed in Table 3.

TABLE 3

| Group | Electrode | Horn/Anvil Size (mm) | Amplitude/Energy/Pressure |
|---|---|---|---|
| A | Unfilled | 5.5 by 7.0/ 5.5 by 7.0 | 100/40/40 |
| B | Filled | 5.5 by 7.0/ 5.5 by 7.0 | 100/64/15 |
| C | Unfilled | 4.0 by 3.7/ 5.5 by 7.0 | 100/40/30 |
| D | Filled | 4.0 by 3.7/ 5.5 by 7.0 | 100/64/15 |
| E | Unfilled | 5.5 by 7.0/ 5.5 by 7.0 | 80/62/40 |
| F | Filled | 5.5 by 7.0/ 5.5 by 7.0 | 80/100/15 |
| G | Unfilled | 4.0 by 3.7/ 5.5 by 7.0 | 80/62/30 |
| H | Filled | 4.0 by 3.7/ 5.5 by 7.0 | 80/100/15 |

The electrodes were tested for impedance and tab pull (tensile) strength. The tensile strength was determined using a Chatillion force gauge. The separating speed was set at 5 mm/min and the force was recorded in kilograms. Impedance testing was performed using a HP4338A impedance meter and an impedance fixture. The impedance was recorded in milliohms. The results are presented listed in Table 4.

TABLE 4

| Group | Impedance (Average, mΩ) | Impedance Range (low/high, mΩ) | Tensile strength (Average, kg) | Tensile Strength Range (low/high, kg) |
|---|---|---|---|---|
| A | 8.09 | 6.23/10.77 | 0.65 | 0.52/0.76 |
| B | 6.62 | 5.88/7.485 | 1.34 | 0.86/2.04 |
| C | 6.57 | 5.92/7.91 | 0.53 | 0.28/0.70 |
| D | 6.68 | 5.77/8.21 | 1.01 | 0.78/1.68 |
| E | 7.68 | 6.98/8.67 | 0.54 | 0.24/0.94 |
| F | 5.73 | 4.49/7.24 | 1.79 | 1.38/2.26 |
| G | 6.71 | 5.33/8.26 | 0.59 | 0.40/0.80 |
| H | 5.41 | 4.69/6.13 | 1.1 | 0.80/1.34 |

In general, the foam filled electrodes achieved tensile strengths that were about 2 to 3 times greater than unfilled electrodes. The impedance was reduced by a factor of about 17%.

Other embodiments are within the claims.

What is claimed is:

1. A method of producing an electrode plate having a conductive tab area comprising the steps of:
   (a) piercing an area of an electrode plate with opposing, offset piercing plates having raised surface probes;
   (b) clearing the resulting area to expose a porous substrate forming a conductive tab area;
   (c) reinforcing the exposed porous substrate; and
   (d) attaching a conductive tab to the reinforced porous substrate.

2. The method of claim 1, wherein the reinforcing step comprises placing a reinforcing material over the exposed porous substrate.

3. The method of claim 2, wherein the reinforcing step further comprises compressing the reinforcing material into the exposed porous substrate.

4. The method of claim 3, wherein the reinforcing material is double ply.

5. The method of claim 3, wherein the attaching step includes applying ultrasonics.

6. The method of claim 5, wherein the ultrasonics include an ultrasonic horn having raised surfaces and an anvil having a flat surface.

7. The method of claim 3, wherein the attaching step includes resistance welding.

8. The method of claim 7, further comprising the step of applying ultrasonics to the reinforcing material compressed into the exposed porous substrate prior to the attaching step.

9. The method of claim 1, further comprising the step of punching a hole in the conductive tab after the attaching step.

10. The method of claim 1, further comprising the step of taping the conductive tab and conductive tab area after the attaching step.

11. The method of claim 1, wherein the clearing step includes applying ultrasonics to the resulting area.

12. The method of claim. 11, wherein the ultrasonics are applied by an ultrasonic horn having a smooth surface and an anvil having raised surfaces.

13. The method of claim 1, wherein the conductive tab is a single layer conductive tab.

14. The method of claim 1, wherein the conductive tab is a double layer conductive tab.

15. The method of claim 1, wherein the exposed porous surface is reinforced by placing a reinforcing material over the exposed porous substrate on two surfaces of the substrate.

16. The method of claim 14, wherein the conductive tab includes nickel.

* * * * *

UNITED STATES PATENT AND TRADEMARK OFFICE
CERTIFICATE OF CORRECTION

PATENT NO. : 6,298,530 B1
DATED : October 9, 2001
INVENTOR(S) : Bruce Ingram, Robert Smith, Robert Pavlinsky and Donald Barber It is certified that error appears in the above-identified patent and that said Letters Patent is hereby corrected as shown below:

<u>Title page,</u>
Item [56], U.S. PATENT DOCUMENTS, please delete "4,329,281" and replace with -- 4,439,281 --.

<u>Column 10,</u>
Line 12, after "claim", delete ".".

Signed and Sealed this

Tenth Day of December, 2002

JAMES E. ROGAN
*Director of the United States Patent and Trademark Office*